United States Patent [19]

Holtz

[11] Patent Number: 4,992,868
[45] Date of Patent: Feb. 12, 1991

[54] TRUE INFORMATION TELEVISION (TITV) AND VISION SYSTEM

[76] Inventor: Klaus E. Holtz, 631 O'Farrell #710, San Francisco, Calif. 94109

[21] Appl. No.: 316,925

[22] Filed: Feb. 28, 1989

[51] Int. Cl.[5] .......................................... H04N 7/12
[52] U.S. Cl. .................................. 358/135; 358/903; 358/160; 358/136
[58] Field of Search ............... 358/135, 125, 108, 209, 358/183, 22, 136, 903, 140, 160; 364/521

[56] References Cited

U.S. PATENT DOCUMENTS

| | | | |
|---|---|---|---|
| 4,366,551 | 12/1982 | Holtz | 901/2 X |
| 4,405,943 | 9/1983 | Kanaly | 358/133 |
| 4,613,269 | 9/1986 | Wilder et al. | 358/903 X |
| 4,688,090 | 8/1987 | Veitch | 358/903 X |
| 4,692,806 | 9/1987 | Anderson et al. | 358/108 X |
| 4,785,349 | 11/1988 | Keith et al. | 358/135 |
| 4,791,486 | 12/1988 | Spriggs et al. | 358/138 |
| 4,853,779 | 8/1989 | Hammer et al. | 358/488 |
| 4,862,264 | 8/1989 | Wells et al. | 358/138 |
| 4,888,014 | 8/1989 | Zeevi et al. | 358/903 X |

Primary Examiner—Victor R. Kostak

[57] ABSTRACT

A learning television system will transmit only true information data which bandwidth is not dependent on screen size or resolution but rather only on novelty and movement within the image. This invention will allow for broadcast transmission of High Definition Television (HDTV) using present TV channels. Before transmission the system is made to learn image pattern by simply pointing the television camera at familiar scenes. During transmission the input images are de-composed into a layered progression of partial images, called superpixel, by comparison with previously learned images. Only the moving portion of an image is transmitted as superpixel where each superpixel may represent any arbitrary large portion of the screen. Superpixel transmission provides great data compression in an all digital TV as well as a virtually unbreakable encryption code for secure communication. The system also provides for roboter vision in a self-learning computer system.

3 Claims, 9 Drawing Sheets

TRUE INFORMATION TELEVISION (TITV) AND VISION SYSTEM

BACKGROUND OF THE INVENTION

In conventional television an image is scanned by a television camera and transmitted, in serial, pixel by pixel. The transmission channel bandwidth of such transmission can be computed approximately as the product of the screen rows, screen columns, scan frequency, colors and brightness resolution. Any improvement in screen size, image resolution or colors, as desired for High Resolution Television HDTV, will quickly crowd the precious channels in the broadcast spectrum reserved for television. HDTV with larger screens and better image resolution using present TV channels is not possible according to basic (Shannon) information theory.

In True Information Television TITV the image data from the television camera is compressed in two ways before transmission. First, only the moving or changing portion of the image is encoded for transmission. Portions of the image which do not change from scan to scan can be stored or remembered by the receiver and need not be re-transmitted at every scan. Second, the image is compared with previously learned image patterns to generate large partial images, called superpixel, which represent large portions of the screen image. A patch of blue sky in the image, for example, does contain very little true information and can be combined into a large superpixel which may represent a very large image portion on the screen. The input image from the camera is compared with previously learned data in a pyramid type progression leading to larger and larger superpixel. Whatever images were previously learned will be converted into high level superpixel representing successively larger portion on the screen. Before any transmission the system must be shown common images via the television camera to learn or absorb the pattern in a process described as the assembly of a parallel infinite dimensional network. Infinite dimensional networks are part of a mathematical theory of learning which were previously published by the inventor. Every new learning process will produce a very unique infinite dimensional network which affects the superpixel code. This may be exploited for encrypted transmissions in a virtually unbreakable code.

True information is believed by the inventor to be equivalent to information perceived by our own brain and eyes. An enlargement of a photograph image, for example, does not provide more information to our own mind. What provides true information is the novelty of the objects in the image because known or familiar objects no matter how large or complex provide only little information. True information is also provided by movement within the image and a stationary image will quickly loose its novelty. The inventor also believes that our eyes and brain have a limited true information bandwidth equivalent to true information television transmission. Any true information transmission in excess of the true information bandwidth of our own eyes and brain would be wasted. A complex pattern on the screen, for example, which moves too fast need not be faithfully reproduced because our own eyes and mind would only perceive it as a blur.

In addition to providing a new kind of digital television, the system can also be used for electronic roboter vision if combined with other self-learning infinite dimensional networks. An object or shape shown to the television camera will produce a code which uniquely identifies that shape or object. The code can later be used to retrieve the shape or object on a television monitor.

A quantum of true information, as expressed in a superpixel, must have two types of information which are: the Pattern address and the Network address. The Pattern address will provide information to answer the question "What is it ?" while the Network address will provide information to answer the question of "Where is it ?" on the screen.

True Information Television TITV may greatly advance the search for a High Definition Television HDTV for the next generation television. It may also provide a way toward roboter Vision in Artificial Intelligence AI.

IN THE DRAWINGS

Figure 3:
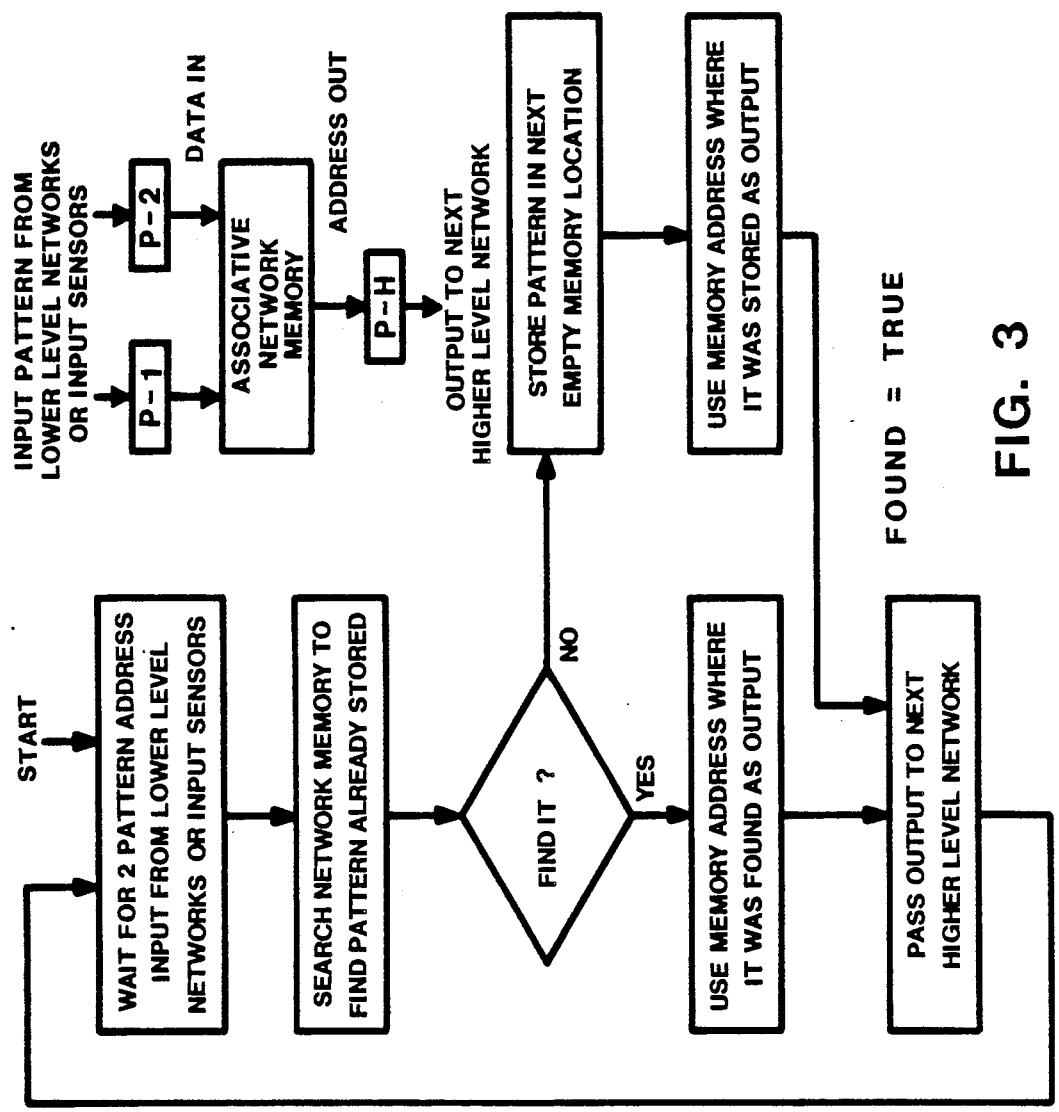

FIG. 3 shows the learning steps to generate a parallel infinite dimensional network. Even though very essential for explaining the operations this drawing is not claimed in this invention because of prior patents by the same inventor. In fact FIG. 3 is the equivalent of FIG. 13 of U.S. Pat. No. 4,366,55 and associated claims 6.

Figure 4:
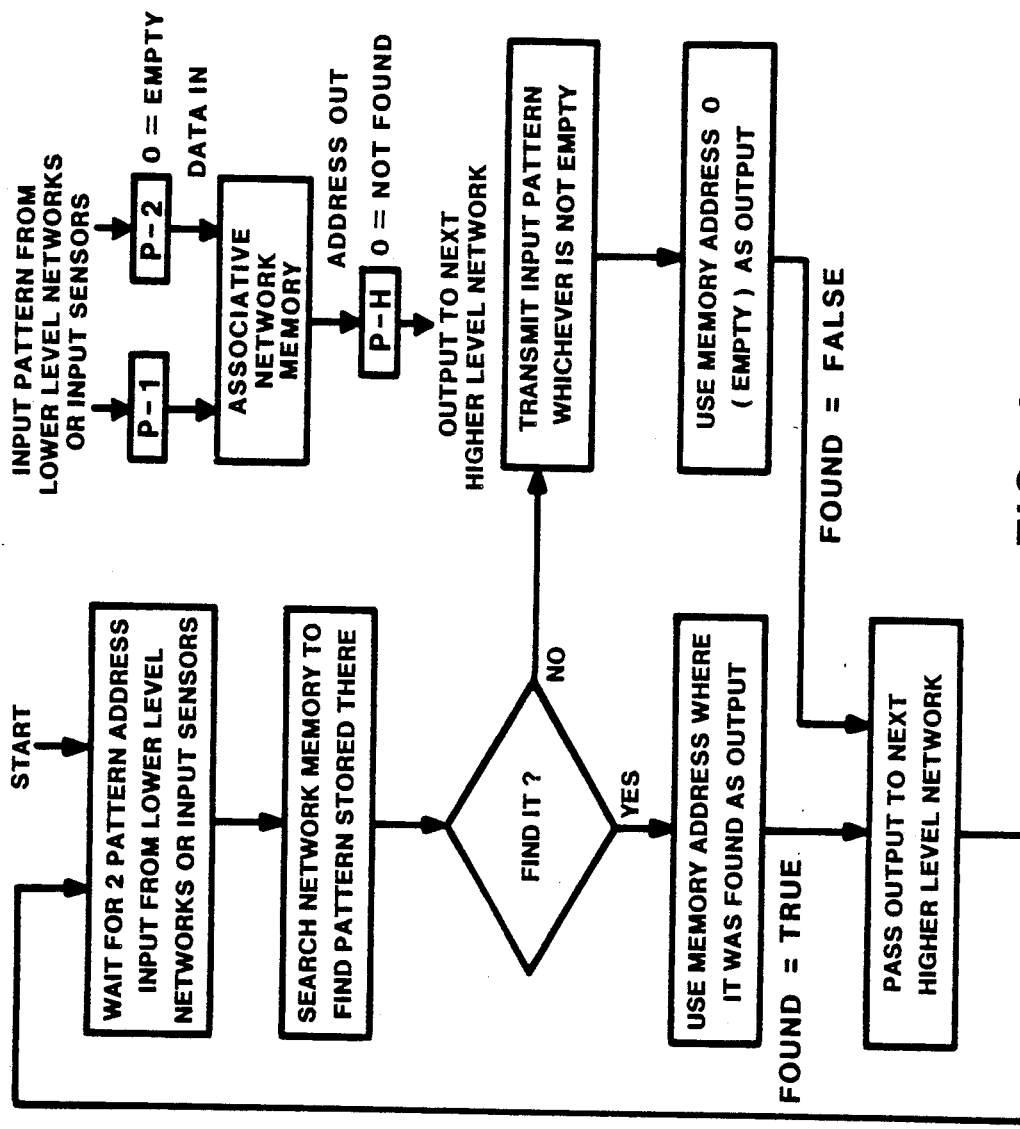

FIG. 4 illustrates the processing steps in encoding and transmitting images via superpixel. These steps are to be used after the learning operation in FIG. 3 have been completed. FIG. 4 serves for illustration only.

Figure 5:
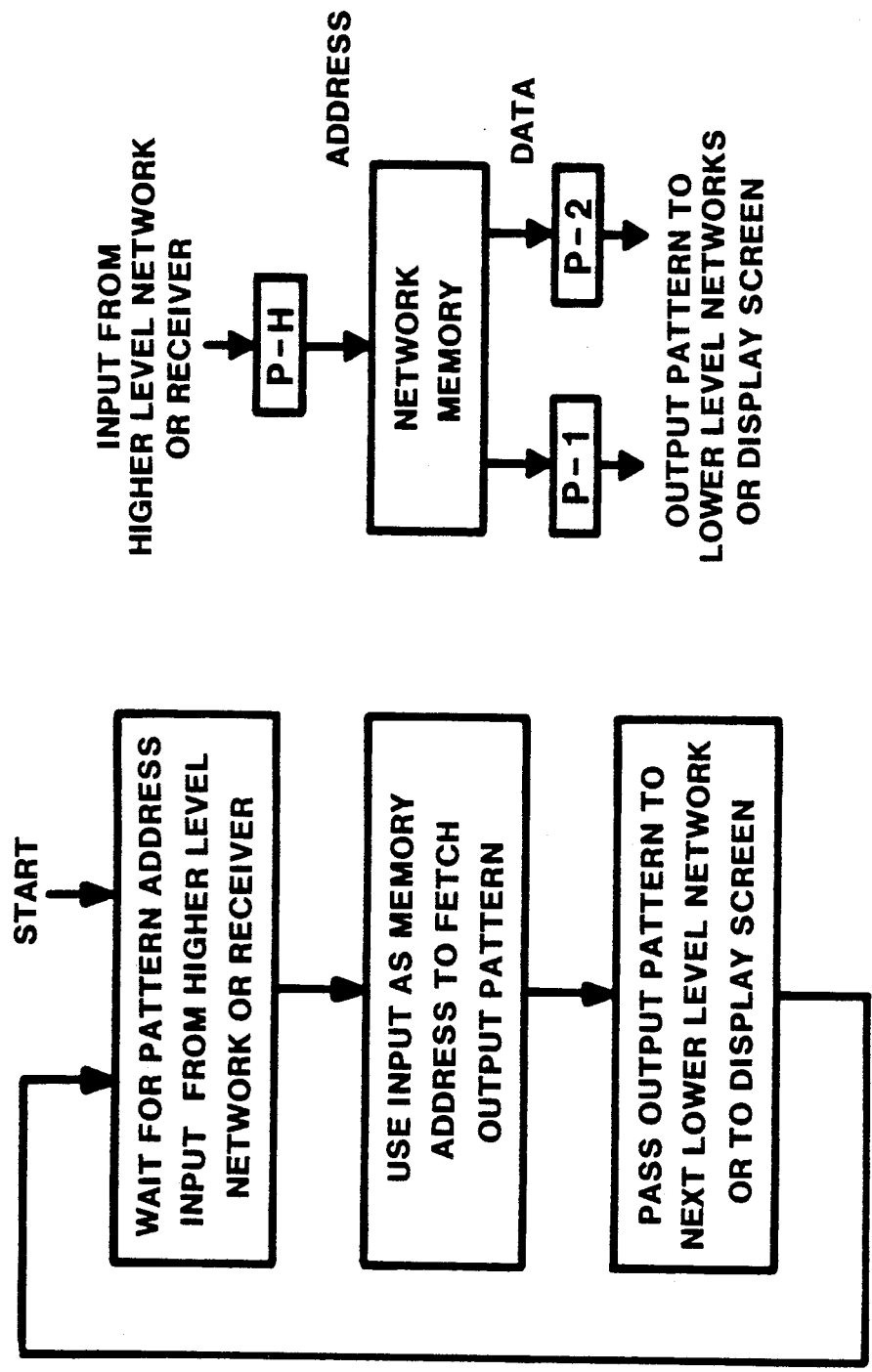

FIG. 5 shows the steps of retrieving images from a parallel infinite dimensional network. These steps are already claimed in U.S. Pat. 4,366,55 claim 7 and are therefore used for illustration only.

Figure 6:
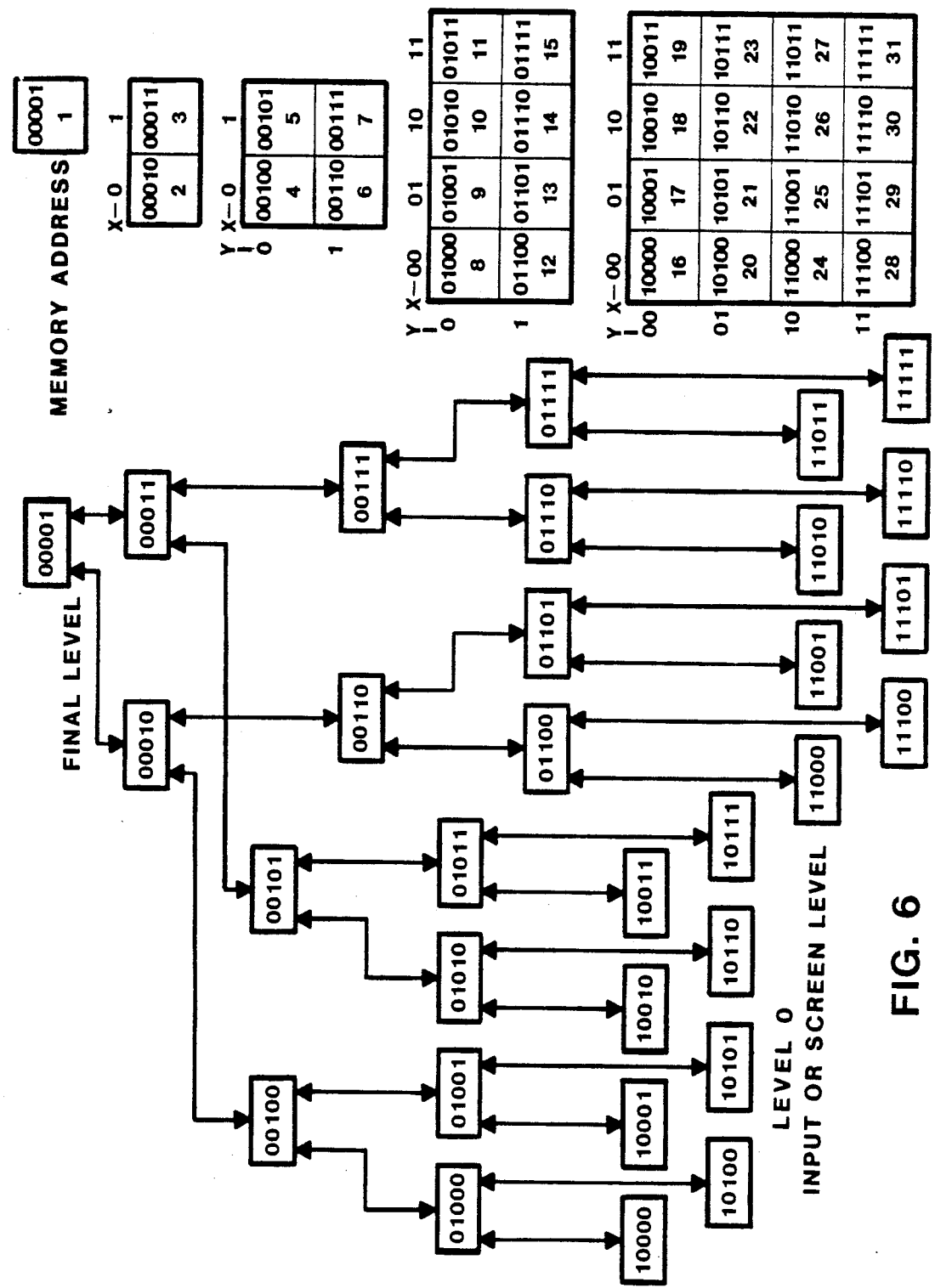

FIG. 6 illustrates the logical connection between the network progression pyramid and the address in the image buffer memory. It shows how to combine lower level images pattern into pairs for conversion in the parallel network memory and where to store the result in a higher level address. In image retrieval it shows how to fetch higher image patterns for conversion by the parallel network memory and where to store the resulting pair of lower level images.

Figure 7:
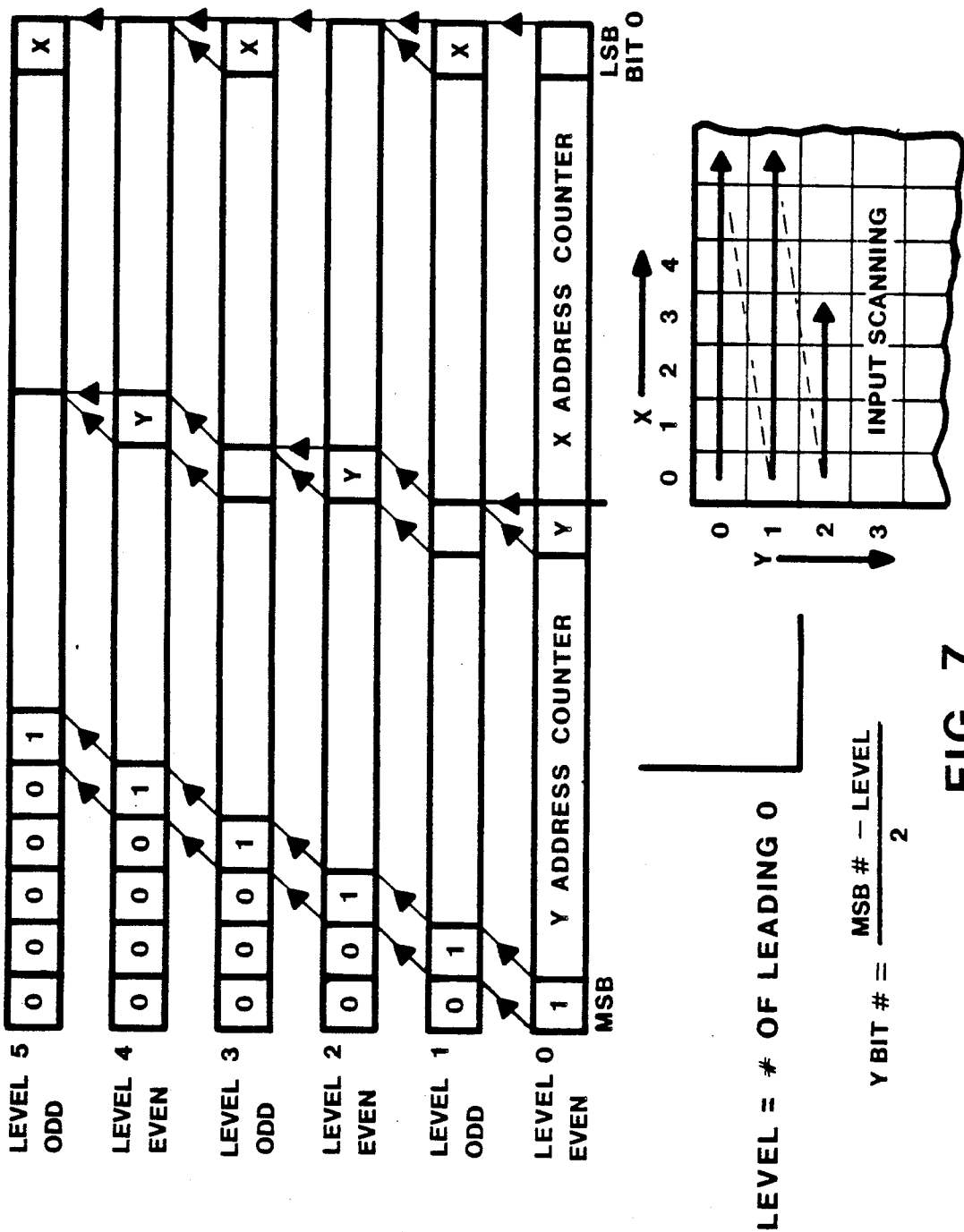

FIG. 7 shows the method of computing higher or lower level network addresses by manipulating the least significant X or Y address bit and by shifting the address left or right. An image is first scanned into an image buffer memory using a binary address counter divided into a separate X and Y address portion. The image is then converted into higher level patterns to be stored in higher and higher level image buffer locations.

Figure 8:
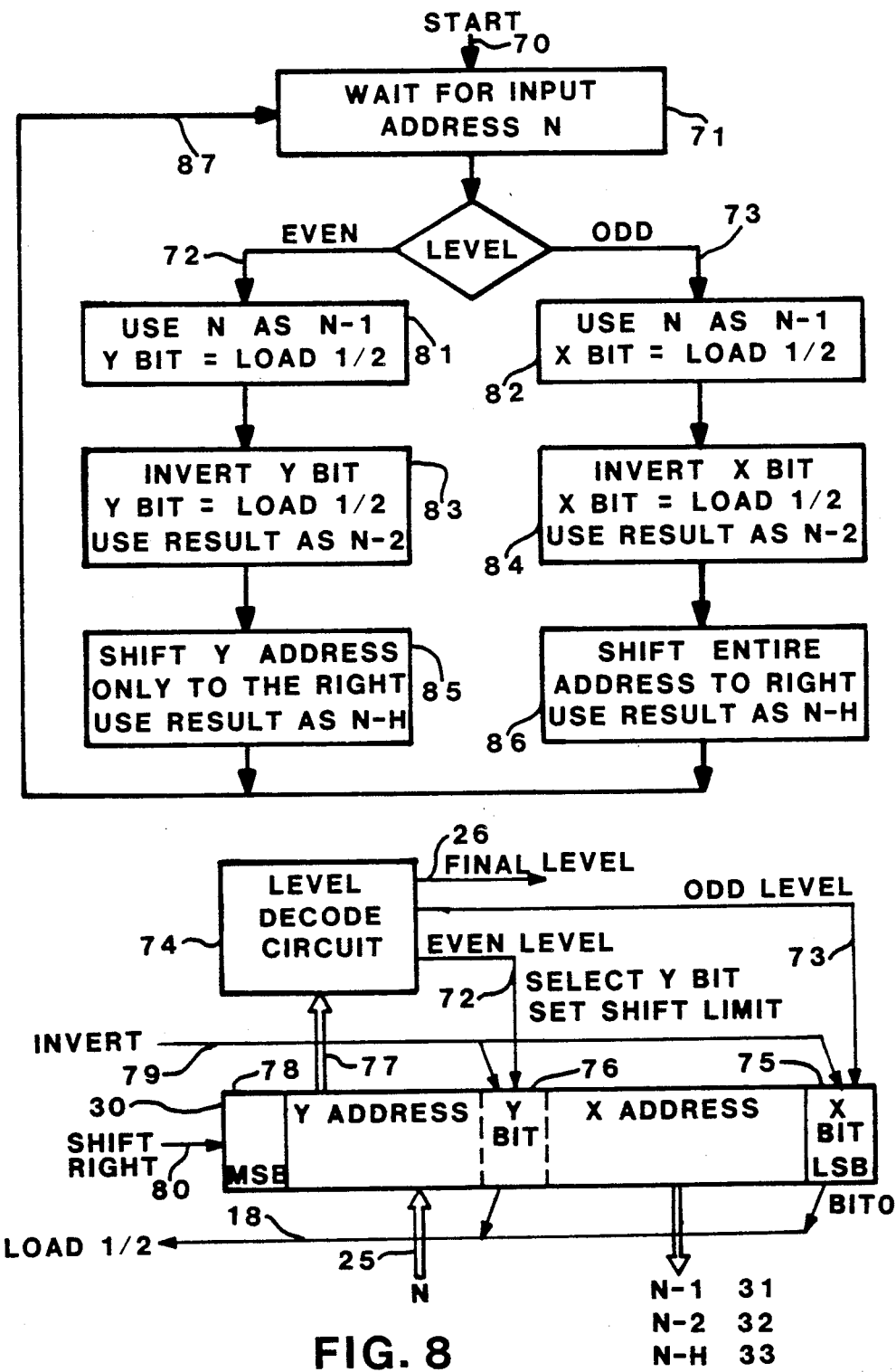

FIG. 8 shows the hardware register and processing steps to find the second member of a pair of lower level image addresses and how to compute the higher level image address. This method is claimed in the fourth claim of this invention.

Figure 9:
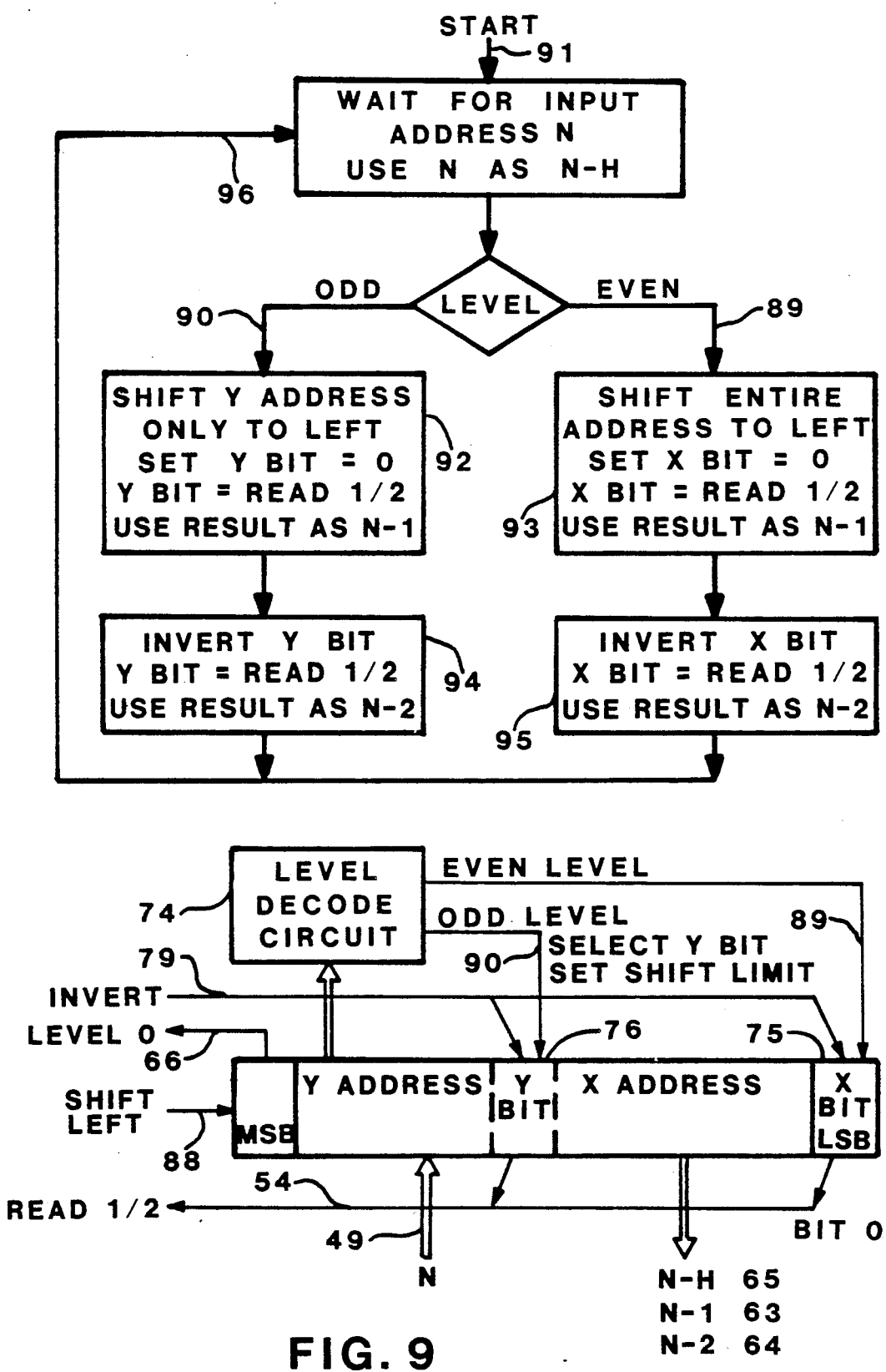

FIG. 9 shows how to generate a pair of lower level image addresses from a higher level image address in an image retrieval operation. This method and hardware comprises the fifth claim of the invention.

DETAILED DESCRIPTION OF THE INVENTION

Figure 1:
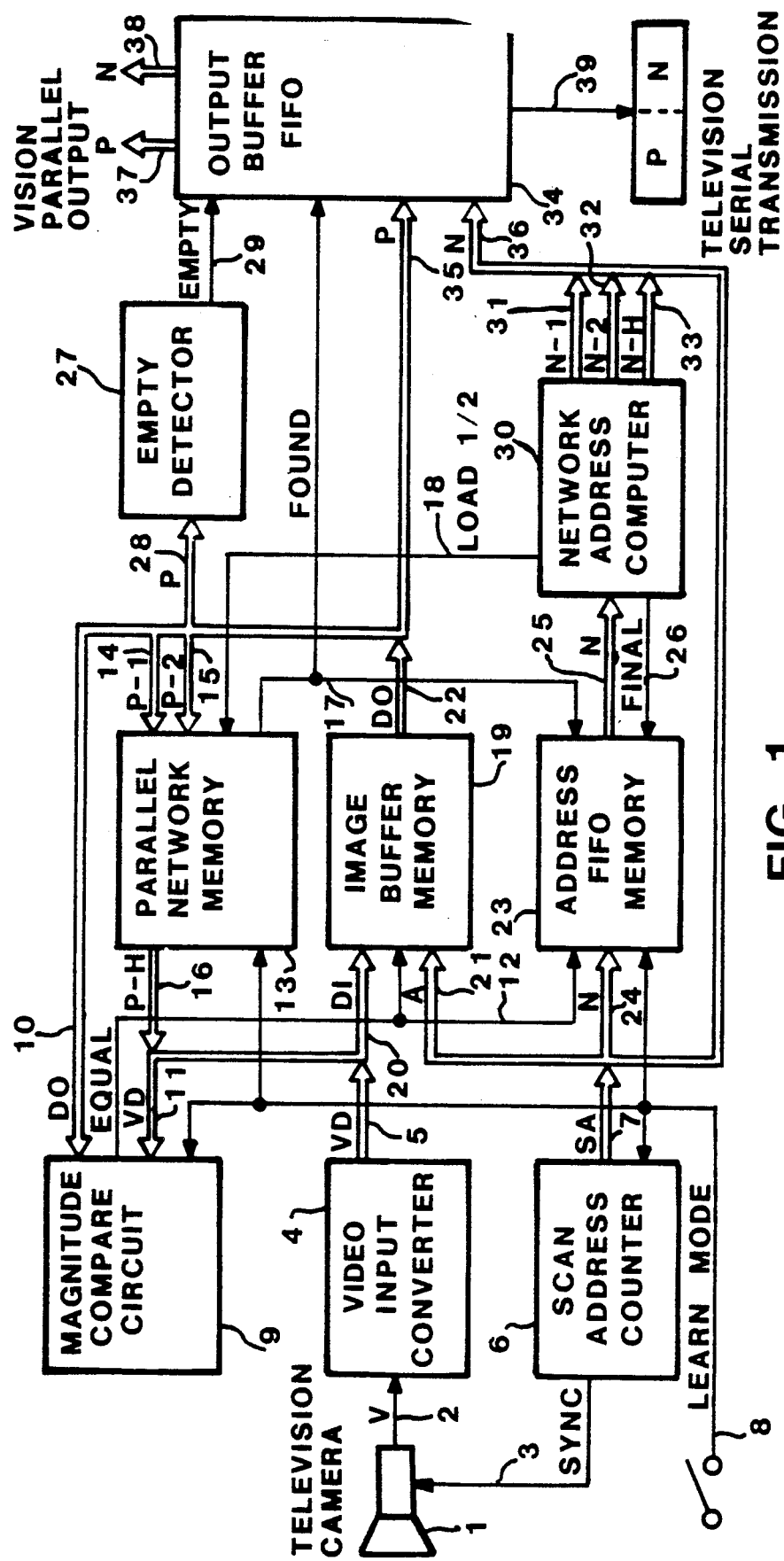
FIG. 1 is a hardware block diagram useful for image learning and encoding of images into superpixel. This systems illustrates the first and second claim of the invention.

Turning now to FIG. 1 which shows the essential hardware components for a video learning and encoding system. LEARN MODE 8 is set by the operator before any transmission is possible. In LEARN MODE 8 image data V 2 received by a television camera is used to generate a parallel infinite dimensional network in the Parallel Network Memory 13. There is no need for programming or human supervision of the process. Simply pointing the camera 1 at familiar scenes will cause the absorption of those images and the automatic growth of the parallel network. Once image learning is complete, the resulting binary bit pattern in the Parallel Network Memory 13 must be transferred to the Parallel Network Memory 50 in the Video retrieval system shown in FIG. 2. This learning operation need be performed only once if the Parallel Network Memory 50 in the Video Retrieval System is implemented as a Read Only Memory (ROM) device which is simply reproduced for every television set.

Once the same parallel network is contained in both Parallel Network Memories 13 and 50 image transmission may commence. Input images received by the television camera 1 are converted into superpixel for either serial television transmission 39 or for parallel output 37 38 in a vision system. Each superpixel is composed of a Pattern address P 37 and a Network address N 38. The Pattern address P 37 defines the specific partial image pattern such as blue sky or rose. It answers the question "What is it ? " as the first information of a visual information quantum. The Network address N 38 defines the specific location of the partial image on the screen. It answers the question "Where is it ? " as the second information of the visual information quantum. A superpixel contains a quantum of true visual information which may be as small as a single screen pixel or as large as a whole screen image. The frequency of superpixel transmission will increase for unfamiliar images and for rapid movement within the image. If the bit pattern in the Parallel Network Memory is kept confidential then the superpixel code transmitted is a virtually unbreakable encryption code for secure communication.

The circuits in FIG. 1 perform the following function:

TELEVISION CAMERA 1 will receive images from the environment for serial readout pixel by pixel. The brightness value V 2 of each pixel is put-out in SYNC 3 with pulses from the Scan Address Counter 6.

SCAN ADDRESS COUNTER 6 is a binary counter circuit used for scanning the input images into the system. It produces SYNC pulses 3 to the camera and a binary scan address SA 7. The binary counter must have enough bit to specify every pixel on the screen plus an extra MSB bit which is set to "1" during the image input scan.

VIDEO INPUT CONVERTER 4 converts the brightness input V 2 from the camera into a digital value VD 5 useful for input to the system.

MAGNITUDE COMPARE CIRCUIT 9 is a binary comparator which compares the binary data DO 10 from the Image Buffer Memory with the digitized brightness value VD 11 of each input pixel. It generates an EQUAL 12 output signal if the comparison is equal within set tolerance limits. The EQUAL signal is always false in LEARN MODE 8. The EQUAL signal may be set true for background levels in a vision system to ignore background such as all light or dark background.

PARALLEL NETWORK MEMORY 13 is an associative memory device which function is further defined in FIG. 3 for learn mode and in FIG. 4 for encoding mode. The input consist of two binary Pattern addresses P-1 14 and P-2 15 which are loaded in separate cycles specified by LOAD ½ 18. It generates a FOUND 17 output signal if the pattern P-1,P-2 is found stored in the associative memory. The FOUND 17 signal is always true in LEARN MODE 8.

IMAGE BUFFER MEMORY 19 is a Random Access Memory (RAM) device which not only stores the pixel in the input image but also the partial image patterns generated by the encoding process. The memory capacity must be twice the number of pixel on the screen. The memory address A 21 specifies the storage location into which input data DI 20 may be stored or from which output data DO 22 may be retrieved during a read operation. An EQUAL 12 input true will inhibit storage in the memory.

ADDRESS FIFO MEMORY 23 is a First-in-first-out (FIFO) memory device which accumulates Network address input N 24 and passe them to the output N 25 when required. Storage to the FIFO memory is enabled by FOUND 17 true and is disabled by FINAL 26 true. During LEARN MODE 8 the memory storage is disabled and an input N 24 is passed immediately to the output N 25.

EMPTY DETECTOR 27 will detect an empty input pattern address P 28 such as an all zero input pattern. The EMPTY 29 output signal will inhibit transmission of empty superpixel.

NETWORK ADDRESS COMPUTER 30 will be defined further in FIG. 8. It is a register circuit which, by shifting and X-Y address bit manipulation, converts an input Network Address N 25 into pair Network addresses N−1, N−2 and a higher level address N-H. It also generates a LOAD ½ 18 signal to specify Pattern Address P-1 or P-2 and a FINAL 26 signal for the highest network level.

OUTPUT BUFFER FIFO 34 is a First-In-First-Out (FIFO) memory device which temporarily stores superpixel before transmission. Input storage of Pattern Addresses P 35 and Network Addresses N 36 will be disabled by EMPTY 29 true or FOUND 17 true. If during television transmission the number of generated superpixel is too high for the available transmission bandwidth then the superpixel may be sorted by level. Only high level pixel are transmitted in fast moving unfamiliar images because our eyes and brain cannot perceive them anyway. This allows for limited bandwidth transmission channels.

LEARN MODE OPERATION

FIG. 1 will now be used to explain the processing steps in learn mode. LEARN MODE 8 is set by the operator to generate a parallel infinite dimensional network in the Parallel Network Memory 13.

Initially, the Scan Address Counter 6 is cleared to all zero except for a one in the Most Significant Bit (MSB=1). The Parallel Network Memory 13 is empty containing no network data at this time.

IMAGE LEARNING SCAN-IN

Scan Address Counter 6 will generate a SYNC 3 to cause the Television Camera 1 to put the pixel brightness data V 2 to the Video Input Converter 4. The Video Input Converter 4 will digitize the input and apply Video Data VD 5 to the Image Buffer Memory Data Input DI 20. Simultaneously, the Scan Address 7 is send as memory Address 21 to the Image Buffer Memory. Because EQUAL 12 is always false in LEARN MODE 8 the Data Input DI 20 will now be stored in Address location A 21. The Scan Address Counter is then incremented and the image storage cycle is repeated for every image pixel until the Scan Address Counter MSB will overflow to zero.

LEARN CYCLE A

The scan-in operation above is now followed by a learn operation. Scan Address SA 7 (with MSB=0) is send to the Address Fifo Memory 23 Network address N 24 which in LEARN MODE is passed immediately through to output N 25. From the input Network address N 25 the Network Address Computer 30 will now generate three cycles of operation with output N−1, N−2 and N-H as well as a LOAD ½ 18 signal.

LEARN CYCLE B

The Network Address Computer 30 will output Network Address N−1 31 which is applied as memory Address A 21 to the Image Buffer Memory 19. The storage location in the Image Buffer Memory 19 specified by A 21 (N−1) is read out as Data Output DO 22 and loaded into either P-1 14 or P-2 15 of the Parallel Network Memory 13 as selected by the LOAD ½ line 18.

LEARN CYCLE C

The Network Address Computer 30 will now output Network address N−2 32 which is applied as Address A 21 to the Image Buffer Memory 19. The storage location specified by A 21 (N−2) is read out as Data Output DO 22 and loaded into either P-1 14 or P-2 15 as selected by the LOAD ½ line 18. With both P-1 and P-2 now available the Parallel Network Memory 13 will generate an output P-H in either of two methods. If the input P-1 14 and P-2 15 is found already stored then the Memory Address in which it was found is output P-H 16. If the input pair is not found in the memory then P-1 14 and P-2 15 are stored in the next empty memory location and the location Address where it was stored is output P-H 16. Refer to FIG. 3 for detailed learning steps.

LEARN CYCLE D

The Network Address Computer 30 will now output Network address N-H 33 which is applied as Address A 21 to the Image Buffer Memory 19. The output P-H 16 from the Parallel Network Memory 13 is applied as Data Input DI 20 to the Image Buffer Memory 19 and stored in a storage location specified by A 21 or N-H 33. The learning operation will now increment the Scan Address Counter SA 7 and loop back to CYCLE A unless the FINAL 26 level is detected in which case the next SCAN-IN cycle shown above will scan the next input image from the television camera and repeat the above operations. LEARN MODE operations may be terminated when enough input images have been learned or the storage capacity of the Parallel Network Memory is reached. Learning or pattern storage will initially proceed very rapidly but will slow down and saturate when more and more patterns are found already stored. The same image or partial image will never be stored twice. There is no image transmission during learn mode.

IMAGE ENCODING AND TRANSMISSION MODE

For image encoding and transmission to be possible a parallel network must have been generated in the learn mode operation. The bit pattern in the Parallel Network Memory 13 must have been transferred to the Parallel Network Memories 50 (FIG. 2) of all authorized receivers.

The Scan Address Counter 6 must be cleared at all zero bit except for the Most Significant Bit at one (MSB=1) for the image scan-in operation.

ENCODING SCAN-IN

An image is scanned by the Scan Address Counter 6 generating a SYNC 3 signal to cause the Television Camera 1 to apply the brightness value V 2 of the next pixel to the Video Input Converter 4. The Video Input Converter 4 will digitize the input and apply a digital Video Data VD 5 both to the VD 11 input of the Magnitude Compare Circuit 9 and to the Data Input DI 20 of the Image Buffer Memory 19. Simultaneously, the Scan Address Counter 6 will output a digital Scan Address SA 7 both to the Address A 21 input of the Image Buffer Memory 19 and to the input N 24 of the Address Fifo Memory 23. Address A 2 (SA) will select a storage location in the Image Buffer Memory 19 which content is read out as Data Out DO 22 and applied as DO 10 input to the Magnitude Compare Circuit 9. Since both inputs: Video Data VD 11 and the previous scan value of that pixel DO 10 are now available, The Magnitude Compare Circuit 9 will generate a true EQUAL 12 output if the two input values are equal within a selected tolerance limit. If EQUAL 12 is true, then the Scan Address Counter is incremented to the next pixel and the scan loop is repeated. If EQUAL 12 is false, then the Data Input DI 20 (VD 5) is stored in the Image Buffer Memory 19 and the Address A 21 (SA 7) is simultaneously stored as Network address N 24 in the Address Fifo Memory 23. The Scan Address Counter 6 is then incremented for the next pixel and the scan in loop continued until the Most Significant Bit of the Scan Address overflows to zero (MSB=0).

At the end of the scan-in operation the Image Buffer Memory 19 will contain a true copy of the input image and the Address Fifo Memory 23 a record of all locations in the image that have changed since the last input scan.

IMAGE ENCODING AND TRANSMISSION

The encoding process is controlled by the Network Address Computer 30 in three cycle operations.

ENCODING CYCLE A

The Network Address Computer 30 will pull an input Network address N 25 from the Address Fifo Memory 23. It will use input Network address N 25 to compute an output Network address N=1 31 which is applied as Address A 21 to the Image Buffer Memory 19. The content of the Image Buffer Memory storage location specified by A 21 (N−1) is read out as Data Output DO 22 and loaded into either P-1 14 or P-2 15 as selected by the LOAD ½ line 18. Network address N−131 and Data Output DO 22 are also temporarily stored into the Output Buffer Fifo 34 via P 35 and N 36 unless the Empty Detector 27 has determined that the Data Output DO 22 via P 28 was an EMPTY 29 pattern such as all zeros.

ENCODING CYCLE B

The Network Address Computer 30 will now generate a Network Address N−2 32 output which is applied as Address A 21 to the Image Buffer Memory 19. The content of the Image Buffer Memory storage location specified by A 21 (N−2) is read out as Data Output DO 22 and loaded either into P-1 14 or P-2 15 into the Parallel Network Memory 13 as specified by the LOAD ½ 18 line. Data Output DO 22 and Network Address N−2 32 are also temporarily stored in the Output Buffer Fifo 34 as P 35 and N 36 unless the Empty Detector 27 determines that DO 22 (P 28) was an EMPTY 29 pattern. With both P-1 14 and P-2 15 now available to the Parallel Network Memory 13 an output P-H 16 will be generated in either of two ways and applied as Data Input DI 20 to the Image Buffer Memory 19. If the input P-1 14 and P-2 15 was found stored in the memory then the location address in which it was found is used for output P-H 16 and the FOUND 17 output line is set true. If the input P-1 14 and P-2 was not found then an EMPTY pattern such as all zero bit is used as output P-H 16 and the FOUND 17 line is set false. Refer to FIG. 4 for detailed steps.

ENCODING CYCLE C

The Network Address Computer will now generate a Network address output N-H 33 which is applied both as Address A 21 to the Image Buffer Memory 19 and as input N 24 to the Address Fifo Memory 23. The Parallel Network Memory output P-H 16 is stored as Data Input DI 20 in the Image Buffer Memory 19 in a storage location specified by A 21 (N-H).

If the FOUND 17 line is true then the input P 35 and N 3.6 to the Output Buffer Fifo 34, temporarily saved in CYCLE A and B, are erased and not transmitted. The output Network address N-H is stored via N 24 into the Address Fifo Memory 23 unless the FINAL 26 level has been detected.

If the FOUND 17 line is false, then the inputs P 35 and N 36 to the Output Buffer Fifo 34, temporarily saved in CYCLE A and B, are used as superpixel for transmission.

Encoding and transmission operations are terminated when the Address Fifo Memory 23 is empty and contains no more address codes. The system would then return to scan-in mode for the next image. Memory capacity in the Address Fifo Memory 23 may be limited because only a small area within an image will change from scan to scan. If too many fast changes occur in the input image then a partial transmission update may be acceptable because our eyes and brain cannot perceive too many changes happening too fast.

VIDEO RETRIEVAL SYSTEM

Figure 2:
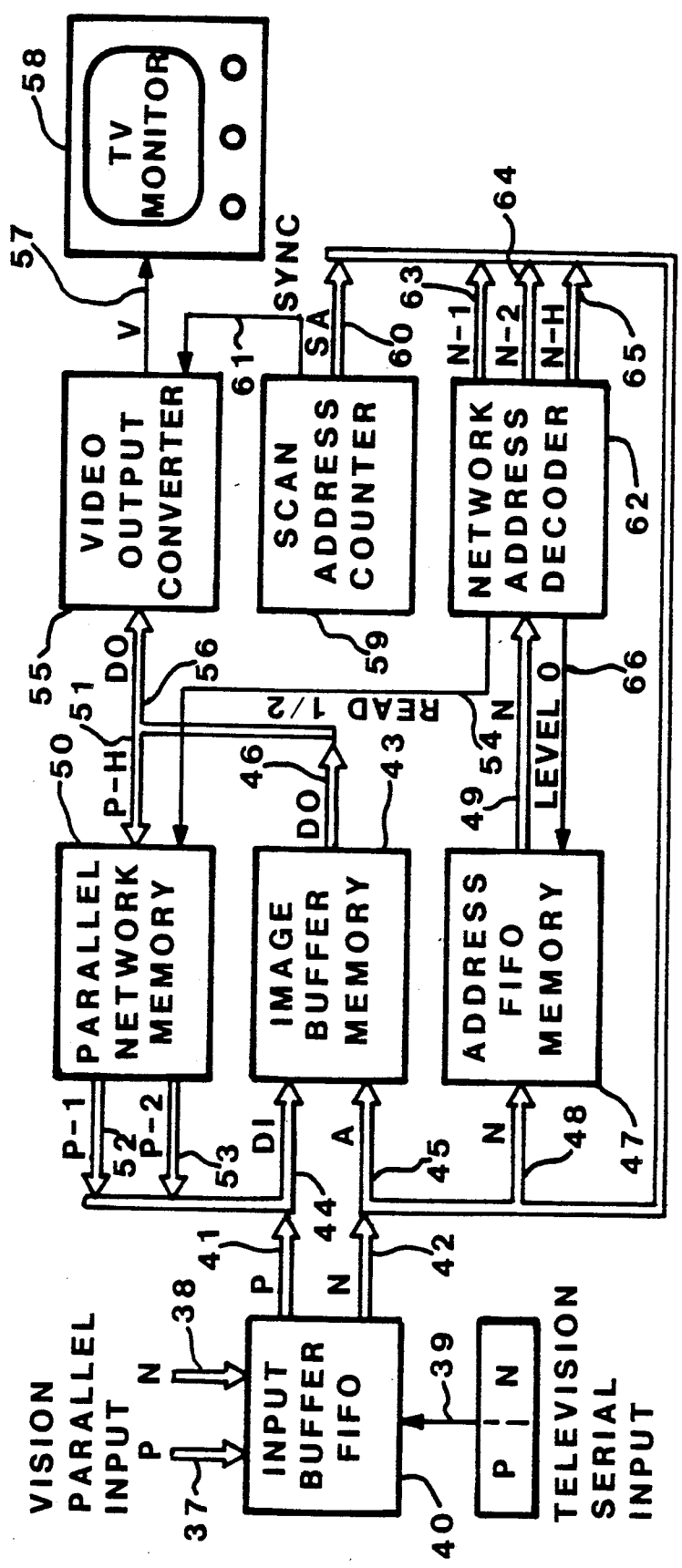
FIG. 2 is a hardware block diagram showing a system for converting superpixel back into television images. This retrieval systems illustrates the third claim of the invention.

Turning now to FIG. 2 which shows a system to retrieve an image on a Television Monitor 58 from superpixel transmission input 37 38 39. Each superpixel combination P and N may specify any size area on the screen from single pixel to entire screen images. Serial input 39 is normally used in television transmissions while vision systems may employ parallel input to retrieve images of objects or shapes 37 38.

FIG. 2 contains the following circuits:

INPUT BUFFER FIFO 40 is a first-in-first-out memory device which will accumulate and store the superpixel input code 37 38 39 until required for image retrieval 41 42.

PARALLEL NETWORK MEMORY 50 may be a Read Only Memory (ROM) containing the bit pattern data generated by a learning operation. This pattern is also called a parallel infinite dimensional network. Both transmitter and receiver must have the same data or network in the Parallel Network Memory. The input P-H 51 is the memory address while output P-1 52 and P-2 53 is the memory data. The READ ½ input line 54 will select either P-1 52 or P-2 53 for data output to the bus. FIG. 5 will further illustrate the operation.

IMAGE BUFFER MEMORY 43 is a Random Access Memory (RAM) with twice the storage locations then the number of pixels on the screen. In memory read Address A 45 will retrieve the data stored in that location on Data Out DO 46. In memory write the Data In DI 44 will be stored in a location specified by the Address A 45.

ADDRESS FIFO MEMORY 47 is a First-In-First-out (FIFO) memory device which should have as many storage locations as the number of pixels on the screen to allow for full screen retrieval. The input Network address N 48 is stored and made available to output N 49 when required. No LEVEL 0 66 Network addresses as identified by the Most Significant Bit Network address equal to one (MSB=1) will ever be stored in the FIFO memory.

VIDEO OUTPUT CONVERTER 55 will convert the digital input data DO 56 into an output V 57 acceptable to the TV Monitor 58. Each output pixel is strobed by a separate SYNC 61 pulse.

SCAN ADDRESS COUNTER 59 is a binary counter circuit to scan the output image from the Image Buffer Memory 43 via the Video Output Converter 55 to the TV Monitor 58. It generates a binary Scan Address SA 60 with as many digits as required to address all pixels on the screen. An extra Most Significant Bit address bit must always be set to one (MSB=1). A SYNC 61 pulse for each pixel is used for synchronizing the Video Output Converter 55.

NETWORK ADDRESS DECODER 62 is a circuit which is further explained in FIG. 9. It will generate Network addresses N−1 63, N−2 64 and N-H 65 from an input Network address N 49. It will also generate LEVEL 0 66 if the Most Significant Address bit is 1 (MSB=1) and a READ ½ 54 line to select either P-1 52 or P-2 53 output from the Parallel Network Memory 50.

TV MONITOR 58 is a normal television set to display the output image generated by the Video V 57 input.

VIDEO RETRIEVAL OPERATION

Cycle Start

A superpixel input is pulled from the Input Buffer Fifo 40 and transferred to the Image Buffer Memory 43. The Pattern address P 41 provides the Data Input DI 44 for the Image Buffer Memory 43 while the Network address N 42 provides the Address A 45 to select the storage location. Simultaneously, the Network address N 42 is stored in the Address Fifo Memory 47 via N 48 unless the Most Significant Address bit is one (MSB=1=LEVEL 0). Network address N 48 is transferred to output N 49.

RETRIEVAL CYCLE A

Network Address Decoder 62 will pull input Network address N 49 to generate output Network address N-H 65 which is transferred to Address A 45 of the Image Buffer Memory 43. The Image Buffer Memory 43 will read the storage location specified by A 45 and display Data Output DO 46 which is send as P-H 51 input to the Parallel Network Memory 50. The Parallel Network Memory 50 will use input P-H 51 as a memory address to fetch data output P-1 52 and P-2 53 as explained in FIG. 5.

RETRIEVAL CYCLE B

The Network Address Decoder 62 will now generate output Network address N−1 63 and READ ½ 54. Network address N−1 63 is used as Address A 45 for the Image Buffer Memory 43 and is also stored via N 48 into the Address Fifo Memory 47 unless the Most Significant Address Bit is one (MSB=1=LEVEL 0). The READ ½ 54 line will select either P-1 52 or P-2 53 on the Parallel Network Memory for Data Input DI 44 and storage in the Image Buffer Memory 43.

RETRIEVAL CYCLE C

The Network Address Decoder 62 will now generate Network address N−2 64 and READ ½ 54. Network address N−2 64 is used as Address A 45 on the Image Buffer Memory 43 and is stored via N 48 into the Address Fifo Memory 47 unless the Most Significant Address bit is one (MSB=1=LEVEL 0). The READ ½ 54 line will select either P-1 52 or P-2 53 output from the Parallel Network Memory 50 as Data Input DI 44 for storage in the Image Buffer Memory 43.

If the Address Fifo Memory 47 is not empty then the cycles are repeated starting with RETRIEVAL CYCLE A. If the Address Fifo Memory 47 is empty then a new superpixel may be pulled for retrieval starting with CYCLE START or a image output scan may be initiated.

IMAGE OUTPUT SCAN

Since an output image is maintained in LEVEL 0 (MSB=1) addresses in the Image Buffer Memory 43 an image output scan may be done at any time. Superpixel transmission will selectively change only the moving portions of the image between scans. Even without superpixel input the non changing image may be scanned to maintain the image on the monitor.

The Scan Address SA 60 is generated by the Scan Address Counter 59 to supply a memory Address A 45 to the Image Buffer Memory 43. The Most Significant Bit of the Scan Address SA 60 must always be one (MSB=1=LEVEL 0). The buffer location in the Image Buffer Memory 43 is read out on Data Out DO 46 and send as pixel brightness values DO 56 to the Video Output Converter 55 to be encoded into Video output V 57. The Scan Output Counter 59 is incremented after each pixel retrieval and output scanning will continue pixel after pixel until the entire image is retrieved.

NETWORK ADDRESS COMPUTING

Turning now to FIG. 6 which illustrates the relationship between Network Addresses and the Image Buffer Memory Addresses. The network address progression is binary, in which lower level networks are combined in groups of two, but larger groups like three of four are possible in a similar network. A binary progression is thought to be most efficient.

In the example a screen of only sixteen pixels is used, but the method will work with any arbitrary large screen with any number of pixel. The LEVEL 0 or input screen level has sixteen pixel addresses arranged in four columns and four rows. Rows and columns are marked with separate X and Y address fields and an extra one Most Significant address Bit (MSB=1) to mark LEVEL 0. Input images are scanned into address LEVEL 0 addresses and output images are scanned from LEVEL 0 addresses.

During image encoding a group of two input pixel is taken from the screen level and compared with pattern stored in the Parallel Network Memory. The result is then stored into a higher level network. Every higher level has only half as many storage locations as the lower level so that the total memory storage requirement of the Image Buffer Memory is equal to twice the number of pixel on the screen. Encoding of images will proceed from the screen LEVEL 0 into higher and higher levels up to a final level. The method of encoding is the same in odd or even levels. A network level is defined by the number of leading zeroes in the Network address and the encoding method depends on alternate levels of odd or even levels.

During image encoding the purpose of the Network Address Generator is to input any arbitrary network address, find the network address of the other member of the pair and to compute the network address of the next higher level. This can be done by manipulating the Least Significant X or Y address bits and by a right shift of the address.

During image retrieval the purpose of the Network Address Decoder is to input any arbitrary network address and determine the network addresses of the lower network pair. This can be done by left shifting the network address and manipulation of the Least Significant X and Y address bit.

NETWORK ADDRESS COMPUTATION

Turning now to FIG. 7 which shows the network address computation process. LEVEL 0 is the screen or image level. It consist of a counter register with separate X and Y address fields. Input images are scanned into the Image Buffer Memory LEVEL 0 and output images are scanned from LEVEL 0 or the Image Buffer Memory. LEVEL 0 is identified by the Most Significant address Bit set to one (MSB=1 =LEVEL 0).

Depending on odd or even numbers of leading zeros in the address (Level #) either the X or Y least significant address bit is changed to find the network address of the other member of the pair. The higher level network address is found by right shifting while lower level pair addresses are found by left shifting.

While the X bit is always BIT 0 or the least significant bit of the whole address field the Y bit depends on the network level. Starting with the least significant address bit equal to BIT 0 then the location of the Y bit can be determined by deducting the level (number of leading zeroes) from the Most significant address bit number and dividing the result by two. Given a fixed screen size and number of pixel in most systems the Y bit is easily determined by fixed logic circuits from the level number.

NETWORK ADDRESS COMPUTER CIRCUIT

Turning now to FIG. 8 which shows the network address computer hardware and method. The purpose of this circuit is to accept any Network address N 25 and to successively generate the matching pair Network addresses N−1 31, N−2 32 and the next higher level Network address N-H 33. It also generates a LOAD ½ 18 line to specify to the Parallel Network Memory 13 whether to load P-1 14 or P-2 15.

The hardware circuit consist of a shift-right (shift one bit space toward the LSB) register 30 and a hardware Level Decode Circuit 74. The number of binary bit in the shift register 30 must be equal to the binary number of screen pixel plus an extra MSB to indicate LEVEL 0 addresses. Starting with the Least Significant Bit LSB 75 as BIT 0 then the Most Significant Bit MSB 78 number is always an even number depending on screen size. The right half portion (X address) must have a separate input for each bit which selects the Y BIT 76 (the least significant bit of the Y address) and the right shift limit. In EVEN 72 level shifts the Y address is shifted right only as far as the Y BIT 76. An INVERT 79 input will either invert the Y BIT 76 output in EVEN 72 levels or the X BIT 75 output in ODD 73 levels. A SHIFT RIGHT 80 input will shift the register content to the right (toward the LSB) for the whole register in ODD 73 levels and only as far as the Y BIT in EVEN 72 levels. A LOAD ½ output is generated by the Y BIT 76 in EVEN 72 levels and by the X BIT 75 in ODD 73 levels.

The Level Decode Circuit 74 will examine the number of leading zeroes in the register 30 via input 77 and generate output signals for: ODD EVEN network level (odd or even number of leading zeroes), a number of SELECT Y BIT lines in even level Network addresses (computed as MSB number minus the number of leading zeroes divided by two) and a FINAL LEVEL 26 to indicate the highest level Network address (all register bit at zero except for the LSB).

NETWORK ADDRESS COMPUTER OPERATION

At the start 70 of operation the circuit will wait for input Network address codes N 25 before proceeding 71. The input Network address is examined by the level decode circuit 74 to decode ODD 73 or EVEN 72 level (odd or even number of leading zeroes) and to select the Y BIT 76. For the first output cycle 81 82 the input Network address N 25 is returned as output N−1 31. In EVEN 72 levels the Y BIT 76 is used as output LOAD ½ 18 while the X BIT 75 is used as output LOAD ½ in ODD 73 levels. In the second cycle 83 84 the output Network address N−2 32 is generated by inverting (using INVERT 79) either the Y BIT 76 in EVEN 72 levels or the X BIT 75 in ODD 73 levels. The LOAD ½ line is also inverted in the second cycle. In the third cycle 85 86 the next higher level output Network address N-H 33 is generated by right shifting (using SHIFT RIGHT 80) the register. In ODD 73 levels the entire register is shifted one location toward the right obliterating the former X BIT 75. In EVEN 72 levels the register is only shifted right as far as the Y BIT 76 thereby obliterating the former Y BIT 76. The X address portion of the register is not changed. After the third cycle 85 86 the operation will return to the input cycle 87.

NETWORK ADDRESS DECODER CIRCUIT

Turning now to FIG. 9 which shows the hardware circuits and operation of the network address decoder. The purpose of this circuit is to accept any (higher level) input Network address N 49 and to successively generate output Network address N-H 65 and lower level pair Network addresses N−1 63 and N−2 64.

The hardware consist of a shift left (shift one bit location toward the MSB) register and a Level Decode Circuit 74. The register must have enough bit to specify all screen pixel plus an extra MSB to specify LEVEL 0 66 addresses. A LEVEL 0 66 output is true when the Most Significant Address Bit is one (MSB=1=LEVEL 0). The register has a special X BIT 75 which is counted as BIT0 and which is always the Least Significant Address Bit (LSB). In the X ADDRESS portion of the register each bit must have a separate input to specify the Y BIT 76 and to limit the left shift to the Y ADDRESS portion. Network address data is loaded into the register via N 49 to generate the three output Network addresses N-H 65, N−1 63 and N−2 64. An INVERT 79 signal will either invert the X BIT 75 or the Y BIT 76 output depending on ODD 90 or EVEN 89 levels. A SHIFT LEFT 88 pulse will shift either the whole address (in even levels) or only the Y ADDRESS (in odd level) one bit location toward the MSB. A READ ½ 54 output signal is generated by the Y BIT 76 in odd levels or by the X BIT 75 in even levels.

The Level Decode Circuit 74 will count the leading zeroes of the input Network address and generate an EVEN LEVEL 89 output if the number of leading zeroes is even. In ODD LEVEL 90 addresses (number of leading zeroes is odd) the Level Decode Circuit 74 will select a single SELECT Y BIT output to select the location of the Y BIT 76 and to limit the left shift to the Y ADDRESS. The specific Y BIT select output is computed by deducting the level (the number of leading zeroes) from the Most Significant Address Bit number (MSB#) (starting with the LSB as BIT 0) and dividing the result by two.

NETWORK ADDRESS DECODER OPERATION

Network Decoder Cycle A

At the start of operation 91 the circuit will wait for input Network address data N 49. It will use the input Network address N 49 as the first output Network address N-H 65 representing the higher level address. The input Network address is examined to determine either ODD 90 or EVEN 89 network level.

NETWORK ADDRESS DECODER CYCLE B In cycle B 92 93 the entire register is shifted to the left in EVEN 89 levels creating a new X BIT 75 set to zero. In ODD 90 levels only the Y ADDRESS is shifted left creating a new Y BIT set to zero. The result after the left shift is used as the second Network address output N−1 65. The READ ½ 54 output line is set equal to the Y BIT 76 in ODD 90 levels and equal to the X BIT 75 in EVEN 89 levels.

NETWORK ADDRESS DECODER CYCLE C

The final pair Network address N−2 64 is generated in CYCLE C 94 95 by inverting either the Y BIT 76 in ODD 90 levels or the X BIT 75 in EVEN 89 levels. The READ ½ 54 line is also inverted. After CYCLE C the encoding process will return to CYCLE A 96.

SUMMARY, RAMIFICATION AND SCOPE

A True Information Television TITV has the following advantages over conventional television:

1. Since the transmission channel bandwidth is not dependent on screen size or resolution a new television system may employ giant screen sizes with very fine resolution using smaller bandwidth channels.
2. Since picture transmission is all digital, from camera to monitor, image quality may be nearly perfect and without "snow" or "ghosts" caused by signal interference or reflections.
3. Generating several Parallel Networks in learn mode and distributing them to authorized receivers only (through exchangeable ROMs) provides a secure television channel transmitting in a virtually unbreakable code.
4. Transmission of extreme low True Information channels, such as picture telephones or teleconferencing, becomes cheap and simple because the images are very simple and move very slowly.
5. Video Recorder may be greatly improved because of reduced storage requirement and distortion free digital recording.

Electronic eyes for roboter will learn how to see by simply looking, via the television camera, at objects in their environment. Even though an object may be represented in many sizes and orientations all these images may be quickly learned where the same image or image portion is never stored twice. Learning of images will quickly saturate in a simple world such as seen by an industrial roboter. For true Artificial Intelligence the above vision system must be combined with other self-learning networks as previously published by the inventor.

Modifications in the display method, such as erasing the stored image during retrieval, will yield a motion sensor in which only the moving portions of the image are shown. This may be useful in security systems. The system may also be made to ignore all previously seen image patterns (high level Network addresses) and show only new information (low level Network addresses).

Electronic roboter vision need not be limited to human senses. Images may be seen in various wave length light, ranging from Radar to Infrared to X Rays, and in various magnifications, ranging from microscopes to telescopes. Other signals, such as sound, electric fields or magnetic fields may used for input.

I claim:

1. An apparatus for reducing the data transmission for digital image sequences comprising:

means of scanning a digitized input image into an image buffer memory containing a plurality of storage locations for storing the image pixel descriptive values and the data cascade address codes;

means of identifying and storing the addresses of input pixels, that have changed their descriptive value since the previous input scan, into an address fifo memory, through a pixel by pixel comparison between the input pixel value and the value stored in said image buffer memory;

means of generating hierarchical data cascades from the address codes in said address fifo memory, through a multi-level comparison between hierarchical image portions in said image buffer memory and a plurality of previously "learned" hierarchical image portions stored in an image pattern memory;

means of identifying said generated data cascades in said image buffer memory, which are found to be identical to the stored data cascades in said image pattern memory, by a first code while identifying the area of the input image containing said data cascade with a second code, means of transmitting "Superpixel" codes comprised of a combination of said first code identifying said data cascade with said second code identifying said image area.

2. An apparatus for visual learning of sequential image sequences by means of multi-stage hierarchical comparison between input image cascades and already stored image cascades, where new input image cascades are absorbed automatically to add to the plurality of already stored image cascades comprising:

means of scanning a digitized input image into an image buffer memory containing a plurality of storage locations for storing the image pixel descriptive values plus the generated data cascade address codes;

means of generating hierarchical data cascades through a multi-level comparison between hierarchical image portions in said image buffer memory and a plurality of previously "learned" hierarchical image portions stored in an image pattern memory where only new image portions are "learned" or added to the already established store of image cascades in said image pattern memory;

means of identifying said generated data cascades in said image buffer memory, which are found to be identical to the stored data cascades in said image pattern memory, by an output code which uniquely identifies the specific input image.

3. An apparatus for the retrieval of sequential images from "Superpixel" codes comprised of a first code identifying an image cascade and a second code identifying the area on the monitor screen containing said image cascade comprising:

means of receiving said superpixel code input;

means of generating an output image cascade from said first code by a multistage hierarchical retrieval of the data cascade from an image pattern memory containing an plurality of previously learned image cascades;

means of specifying an area on said monitor screen through said second code to direct said out put image cascade onto said area on said monitor screen.

* * * * *